Patented Aug. 17, 1954

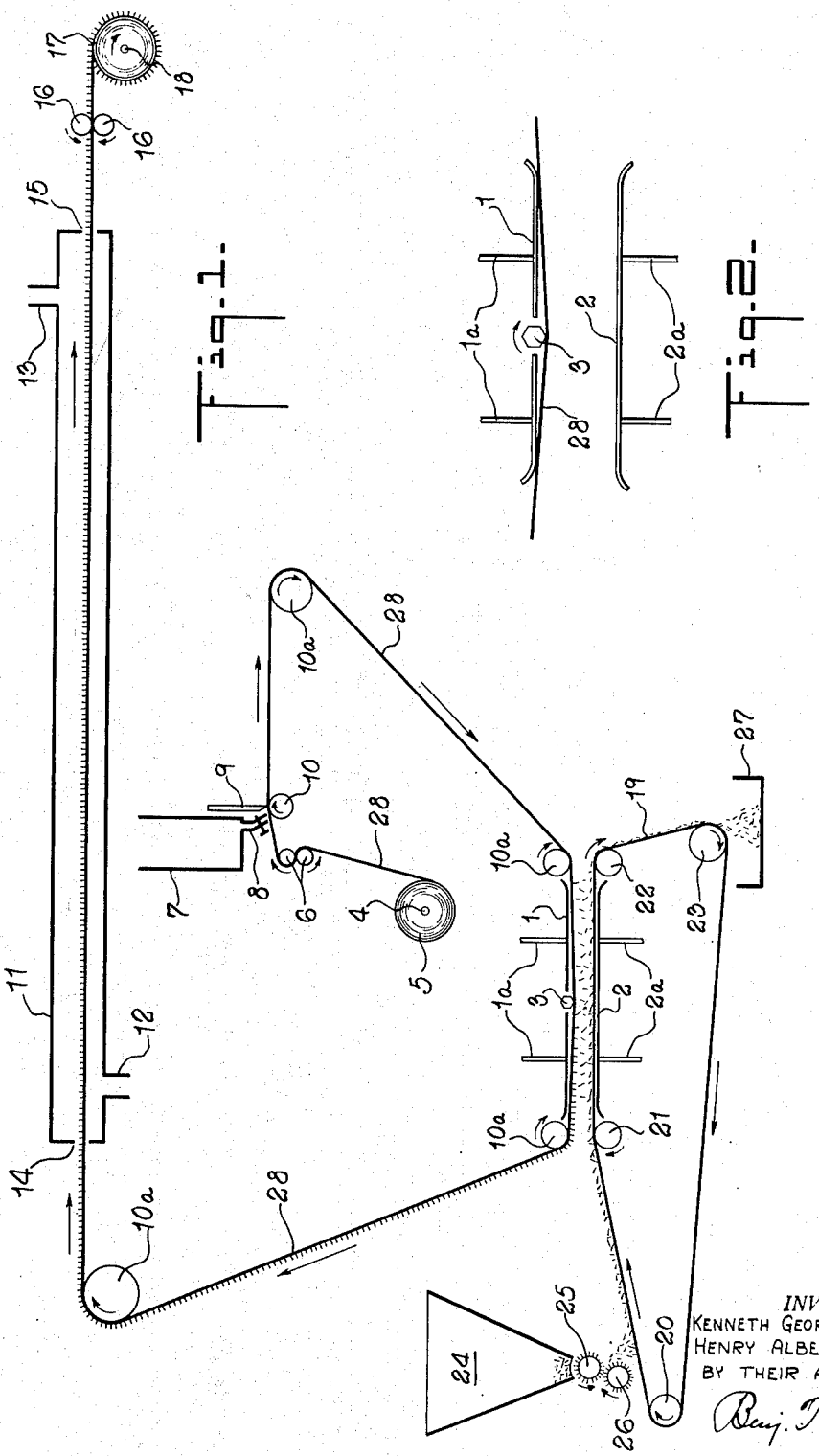

2,686,733

UNITED STATES PATENT OFFICE 2,686,733

PRODUCTION OF PILE FABRICS

Kenneth George Burridge, Sutton Coldfield, and Henry Albert Hirst, Bramhall, England, assignors to Dunlop Tire and Rubber Corporation, Buffalo, N. Y., a corporation of New York Application July 17, 1951, Serial No. 237,144

5 Claims. (Cl. 117—17)

This invention relates to the production of pile fabrics and particularly to their production by electrostatic deposition.

Apparatus has been described for the production of pile fabrics by electrostatic deposition which comprises a pair of vertically spaced electrodes and means for passing adhesively coated backing material and a belt carrying pile-forming fibres in contact with adjacent surfaces of the upper and lower electrodes respectively, so that when an electric field is produced between the electrodes the fibres are carried towards the backing material and adhere to the adhesive coating. In order to remove unattached or loosely held fibres it has been proposed to vibrate the electrode adjacent the coated fabric intermittently.

An object of our invention is to provide an improved apparatus for the electrostatic production of pile fabrics by means of which pile fabrics having an increased number of pile fibres per unit area may be obtained as compared with pile fabrics produced by the apparatus referred to above.

According to the present invention apparatus for the electrostatic production of pile fabrics comprises a pair of vertically spaced electrodes, means for passing adhesively coated backing material in contact with the upper electrode with the adhesive-coated surface downwards, means movable independently of the electrodes for vibrating the backing material as it passes through the space between the electrodes and means for delivering fibrous material to the space between the electrodes.

The means for vibrating the backing material (hereinafter referred to as the "vibrator") is designed to effect rapid vibration of the backing material preferably at the rate of the order of 5,000 to 15,000 cycles per minute. Preferably the vibrator is a solid or hollow bar having a polygonal cross-section, or the bar may have a star-shaped cross-section; the bar may also be a circular rod mounted eccentrically or it may be a circular rod with members, e. g. paddles, projecting beyond the circumference of the bar.

The vibrator may be mounted on the upper electrode in a slot thereof or it may be mounted on supports separate from the electrode. The vibrator may also be mounted between two separate members forming the upper electrode.

The vibrator may also be a rod disposed in contact with the backing material arranged to vibrate rapidly up and down in a vertical plane through its axis.

One embodiment of the invention is illustrated diagrammatically, by way of example, in the accompanying drawings in which Fig. 1 is an elevation of apparatus embodying the invention, the electrodes being shown in cross-section along their length, and Fig. 2 is an enlargement of part of Fig. 1 showing the two electrodes and the vibrator.

The apparatus comprises an upper electrode 1 and a lower electrode 2 the two electrodes being vertically spaced apart by supports 1A and 2A respectively. The upper electrode 1 has a slot extending across the width of the electrode in which there is rotatably mounted a hexagonal bar 3 which can be rotated by a motor through variable speed mechanism (not shown). The bar 3 is mounted so that it projects below the face of the upper electrode 3 and thus into the inter-electrode space. Above the upper electrode 1 there is a support 4 for a rotatable stock roll 5. The apparatus also comprises two nip rollers 6 and container 7, for adhesive, having an outlet 8. The outlet is immediately behind a spreading knife 9 below which there is a supporting roller 10. Above the container 7 there is a heating chamber 11 having an inlet 12 and an outlet 13 for air and two slots 14 and 15 for the introduction and removal respectively of backing material. Adjoining the heating chamber 11 nearest the slot 15 there are two nip rollers 16 and a rotatable take-up roll 17 supported by a support 18.

The apparatus also comprises additional guiding rollers 10a for guiding a backing material 28 through the apparatus.

In contact with the lower electrode 2 there is an endless belt 19 which is supported by supporting rollers 20, 21 and 22 and the driving roller 23. Above the upstream part of the endless belt 19, i. e. the part between supporting rollers 20 and 21, there is a fibre hopper 24, and below the fibre hopper 24 are two rotatable cylindrical brushes 25 and 26. Part of the brush 25 extends into the fibre hopper 24 and the bristles 25 and 26 interpenetrate. Brushes 25 and 26 are connected through gearing to a driving motor whereby brush 25 can be rotated anticlockwise, and brush 26 can be rotated much more rapidly than brush 25 and in the opposite direction. Beneath the driving roll 23 there is a tray 27.

In use, a stock roll 5 of backing material 28 is placed on the support 4 and backing material therefrom is passed between the nip rollers 6, between the supporting roll 10 and the spreading knife 9, over the guiding rollers 10a and in close contact with the upper electrode 1 and the bar 3. Thence the backing material 28 passes over the additional supporting rollers 10a and through the heating chamber 11, entering by the slot 14 and leaving by the slot 15, and thence between nip rollers 16 onto the take-up roll 17.

The hexagonal bar 3 is set in motion and the nip rollers 6 and 16 are also set in motion so that the backing material 28 travels suitably tensioned under the upper electrode 1 and in close contact with the bar 3. It is thus vibrated whilst it is passing through the space between the two electrodes. The optimum speed of vibration will depend on e. g. the strength of the field and the spacing of the electrode but is usually between 5,000 and 15,000 cycles per minute, and when rayon fibres are deposited the optimum vibration frequency is about half the optimum vibration frequency when cotton fibres are deposited. The endless belt 19 is set in motion by means of the driving roller 23 which is driven by a motor through a variable speed mechanism (not shown). The cylindrical brush 25 is rotated anti-clockwise at a speed approximately equal to that of the belt 19 and the cylindrical brush 26 is rotated clockwise at a speed approximately four times the speed of the brush 25. Rayon fibres, suitably of average length 0.5 mm., are charged into hopper 24 and are gradually removed therefrom on brush 25 from which they are removed by brush 26 and evenly showered onto the endless belt 19. Any loose fibres which may leave the space between the electrodes 1 and 2 are collected in the tray 27.

Adhesive in the adhesive container 7 is allowed to flow at a suitable rate through the pipe 8 onto the backing material 28 at a point immediately behind the spreading knife 9. The spreading knife 9 is adjusted by means (not shown) so that the latex is spread onto the backing material to a thickness of from 0.006 to 0.012 inch. The upper electrode 1 and lower electrode 2 are connected to opposite poles of a high voltage generator (not shown). A suitable voltage to be applied to the electrodes is one which produces a voltage drop between the electrodes of 12,000 volts/cm. The heating chamber 11 is heated electrically by means not shown and a current of air is circulated through the heating chamber entering at inlet 12 and leaving at the outlet 13.

As the adhesive-coated backing material passes through the space between the two electrodes to which fibres are supplied on the endless belt 19, the fibres move to the backing material 28 and the capillary action of the adhesive on the backing material causes the ends of the fibres to enter the adhesive layer. Any loose fibres which may not have reached the adhesive are removed through the action of the vibrator bar 3 and fall back onto the endless belt 19 from whence they are again caused to move up against incoming backing material or are transported to the end of the conveyor belt and fall onto the tray 26. Backing material to which the fibres adhere are then passed through the heating chamber 11 where the adhesive is set, the air current passing through the heating chamber removing moisture and any solvent which may be present.

It has been found that by using apparatus in accordance with the invention an increased number of fibres per unit area is obtained as a result of the rapid vibration of the backing material produced by a rapidly rotating bar e. g. one having a polygonal cross-section.

If the plate electrode itself is vibrated the backing material cannot be made to vibrate as rapidly. The number of fibres per unit area of the backing material increases with the number of vibrations of the backing material as any loose fibres which have not reached the adhesive coating are shaken off more quickly as the number of vibrations increases whereby the loose fibres become reoriented in the electric field and thus space is left for more fibres to reach the backing material. More fibres reach the adhesive-coated backing material and a greater fibre density results.

The vibration of the backing cloth independently of the upper electrode also results in smaller frictional resistance between the cloth and the electrode than if vibration of the cloth were brought about by maintaining it in contact with the electrode and vibrating the electrode. In the latter arrangement it is necessary to maintain a considerable tension in the cloth, and thus considerable pressure between the cloth and the electrode, to ensure that the cloth vibrates at the required frequency.

Although the invention has been described with reference to the use of a single polygonal rod as the vibrator, several such rods may be used spaced at intervals along the upper electrode in the path of the backing material.

Having described our invention, what we claim is:

1. Apparatus for the electrostatic production of pile fabrics which comprises a pair of vertically spaced electrodes, means for passing adhesive-coated backing material between said electrodes and adjacent to the upper electrode with the adhesive-coated surface downwards, means movable independently of the electrodes for vibrating the backing material as it passes through the space between the electrodes and means for delivering fibrous material to the space between the lower electrode and the backing material.

2. Apparatus according to claim 1 in which the means for vibrating the backing material is a bar having a polygonal cross section mounted across the width of the backing material adjacent and projecting downward from the upper electrode and means for rapidly rotating the bar about its axis.

3. Apparatus according to claim 2 in which the upper electrode has a slot extending across the path of the backing material, and the bar is rotatably mounted in the slot.

4. The apparatus of claim 1 in which said means for delivering fibrous material to the space between the lower electrode and the backing material comprises a belt conveyor between the lower electrode and said adhesive coated backing and a supply to supply said fibrous material uniformly to said belt conveyor.

5. A method for the electrostatic production of pile fabrics which comprises bringing a supply of pile fibers below a sheet of backing material adhesively coated on its under surface, electrostatically projecting said pile fibers upwardly to said adhesively coated side of said backing sheet by an electrostatic field of unvarying strength and continuously vibrating said backing sheet vertically while said pile fibers are projected to said adhesively coated under surface thereof.

References Cited in the file of this patent

UNITED STATES PATENTS

| Number | Name | Date |
|---|---|---|
| 2,128,811 | Foster | Aug. 30, 1938 |
| 2,173,078 | Meston | Sept. 12, 1939 |
| 2,218,445 | Wintermute | Oct. 15, 1940 |
| 2,254,016 | Melton et al. | Aug. 26, 1941 |
| 2,328,904 | Hiers | Sept. 7, 1943 |